No. 655,711. Patented Aug. 14, 1900.
E. G. HOFFMANN.
THRUST BEARING FOR SHAFTS.
(Application filed Oct. 4, 1899.)

(No Model.)

WITNESSES.
L. R. Moore
John M. Scoble

INVENTOR.
Ernst Gustav Hoffmann
by Redding, Kiddle & Greeley
Attys

UNITED STATES PATENT OFFICE.

ERNST GUSTAV HOFFMANN, OF CHELMSFORD, ENGLAND.

THRUST-BEARING FOR SHAFTS.

SPECIFICATION forming part of Letters Patent No. 655,711, dated August 14, 1900.

Application filed October 4, 1899. Serial No. 732,493. (No model.)

*To all whom it may concern:*

Be it known that I, ERNST GUSTAV HOFFMANN, a subject of the German Emperor, residing at Chelmsford, in the county of Essex, England, have invented a certain new and useful Improvement in Thrust-Bearings for Shafts and the Like, of which the following is a specification.

My invention relates to an improvement in thrust-bearings for shafts and the like, one object being to provide a bearing which is capable of adjusting itself automatically to inequalities of movement in the running of the shaft, a further object being to provide a self-contained bearing which may be made in various sizes as a separate article of commerce for application to the shafts, spindles, and the like of various kinds of machinery.

According to my invention I employ a ball-bearing the cone member of which is so formed and seated or carried that it is capable of a rocking movement to adjust itself to the movement of the shaft. The thrust is taken first by a cup part of a ball-bearing, which also forms a cover for the casing and through which a part of the shaft passes, such cup part having its track portion preferably so shaped as to provide two bearing-surfaces for the balls, which latter transmit the thrust to a cone-ring loosely surrounding a reduced end of the shaft, such ring having a conical surface, on which the balls bear, preferably, at a single point. The under side of this ring is formed as a segment of a circle and seats on a correspondingly-curved base, which may form a part of a casing inclosing or holding the ring and cup. In practice in place of the curved surfaces, which are expensive to produce, these surfaces may be conical and that of the ring may correspond with the surface used as the ball-track, so that it may be reversed when worn. In this case the ring in section will be an outwardly-tapering truncated cone, loose both as regards the shaft and the casing, so that an unequal thrust in one direction on one side will cause it to move in the opposite direction on its curved (or conical) surface in the other, so that the thrust of the shaft on the balls will be equalized. The ring is provided with ledges to prevent the escape of the balls.

My invention is illustrated in the accompanying drawings, in which—

Figure 1:
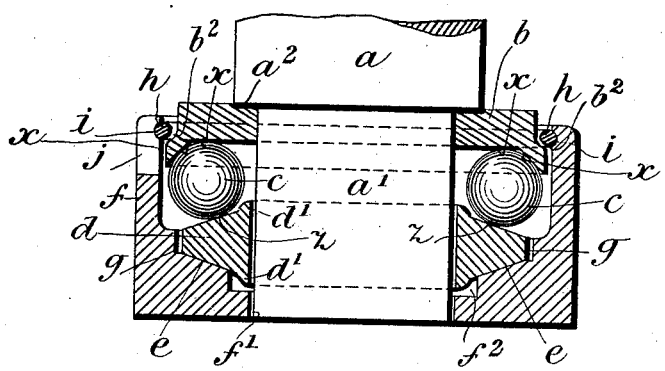
Figure 2:
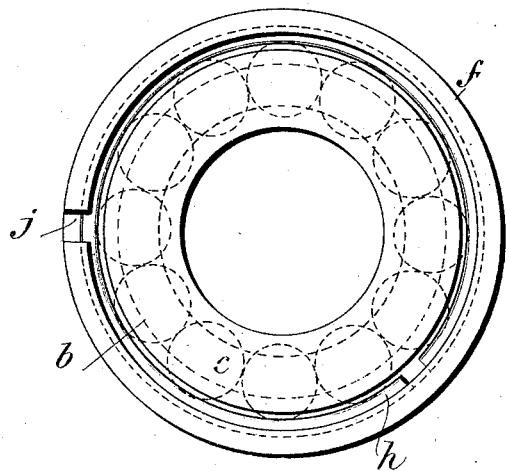

Figure 1 is a sectional elevation of one form of bearing constructed according to same, the shaft or spindle being shown in elevation; and Fig. 2 is a plan of the bearing with the shaft or spindle removed.

The shaft or spindle $a$ must be provided with a reduced end $a'$, the shoulder $a^2$ so formed resting on the upper side of the cup member $b$, through an opening in which the reduced part $a'$ passes and in which it closely fits, or the shaft may be straight and be provided with a fixed collar to act as the shoulder $a^2$. The under side of the cup-member portion is so shaped that the balls $c$ bear on two points $x\ x$. The shaft also loosely passes through the cone member $d$, the section of which is that of a truncated cone and on the upper side of which the balls $c$ bear at a single point $z$, said cone being seated on a corresponding cone-surface $e$ of a casing $f$, which may be provided with an opening $f'$ in its base, into or through which the shaft may loosely enter or pass. The cone-surfaces of the cone member and seat may be formed on a segment of a circle of large diameter or be true cones, (both forms being hereinafter deemed to be included in the term "cone,") either form enabling such cone member to adjust itself by a lateral rocking or sliding movement on the seat $e$, a space $g$ being provided between the outer end of the cone and the wall of the casing $f$ for this purpose. This lateral movement produces through the pressure on the balls a corresponding movement on the loose cup member, so that the whole bearing is tilted according to the angle or position the shaft assumes, and hence said shaft is provided with a bearing which takes equally the thrust upon it.

To prevent the balls from falling out of the casing when the shaft is removed, the cone member $d$ is provided on its track side with a ledge or flange $d'$ in case the balls used are of such a diameter that without it they might escape, and as the cone member has both faces alike in order that it may be reversed on its seat when the balls have worn it on one side such ledge $d'$ is formed on both faces, the seat $e$ of the casing being provided with a recess $f^2$ to loosely receive the one on the under side.

The cup member $b$ forms a cap or cover to the casing or housing and is held in place by an open ring of spring-wire $h$, which seats in a groove $i$ in the casing, the part $b$ having a shoulder $b^2$ passing under such ring and which prevents its being removed when the ring is in place. To remove the ring, the top edge of the casing is slotted, as at $j$, so that a tool may be inserted to enable it to be levered out.

It will be seen that all the parts of the bearing proper are capable of a free movement and that the casing or housing makes the whole bearing a perfectly self-contained one and as such ready to be handled and useful from a commercial point of view, as the user has nothing to do with it except put it in the place where it has got its work to do without taking any parts away or having to provide other incidental devices on the machine whenever the bearing may be used.

What I claim is—

1. In a ball thrust-bearing and in combination, a reversible cone member having two oppositely-arranged cone-faces each provided with a ledge for retaining the balls, a shaft on which the cone fits loosely and on which it is free to rock, and a casing having a seat for such member shaped to correspond to the face of same and on which it can take its rocking movement, substantially as described.

2. In a ball thrust-bearing and in combination, a casing having an opening in its base, a shaft having a reduced portion adapted to pass loosely into same, a cover for the casing forming the cup member of a cup-and-cone ball-bearing, on the upper side of which the larger portion of the shaft rests, a cone member in the casing, and an open spring-ring inserted in a groove in the casing above the cover for retaining the parts in place, substantially as described.

3. In a ball thrust-bearing, and in combination, a casing, a cover for the same forming the cup member of a cup-and-cone ball-bearing, means for retaining such cup in place, and a reversible cone member having two oppositely-arranged cone-faces each provided with a ledge for retaining the balls, said casing having a seat for such member shaped to correspond to either face of the same and on which it is capable of movement, substantially as described.

In testimony whereof I have hereunto set my hand in the presence of two subscribing witnesses.

ERNST GUSTAV HOFFMANN.

Witnesses:
W. M. HARRIS,
ALLEN PARRY IMER.